Dec. 1, 1936.                    D. L. SMITH                    2,062,380
                                 TEMPLATE
                           Filed March 13, 1936.
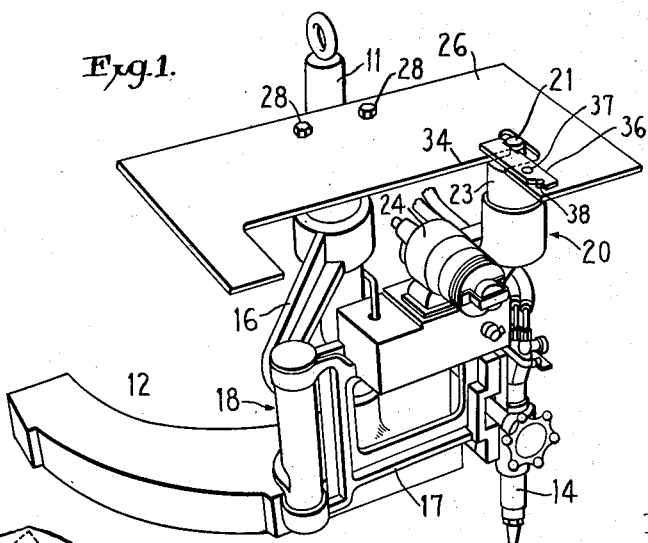
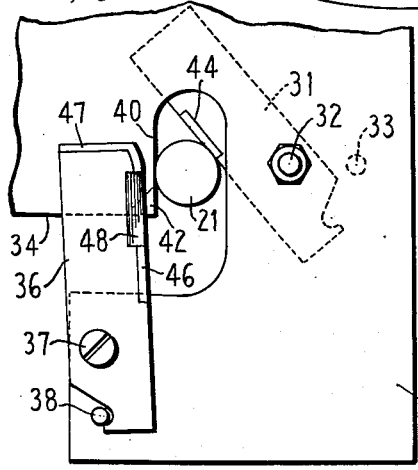
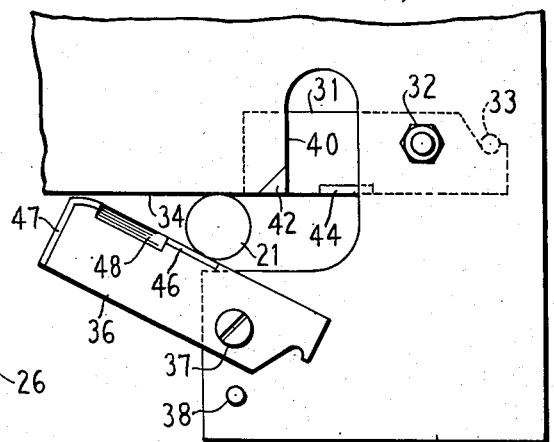
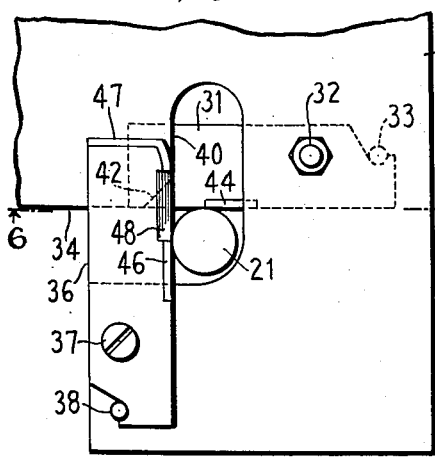
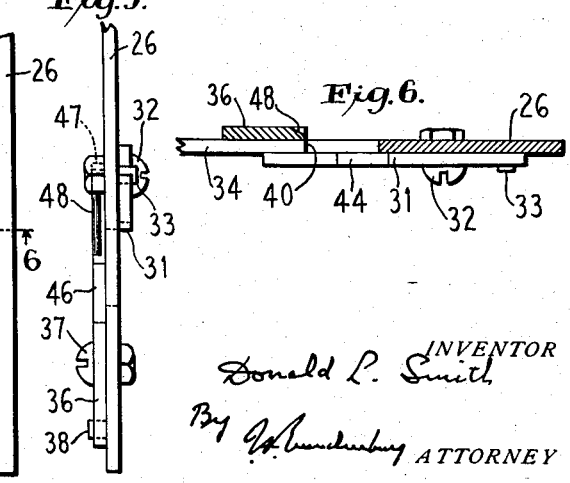
INVENTOR
Donald L. Smith
By                ATTORNEY Patented Dec. 1, 1936

2,062,380

UNITED STATES PATENT OFFICE 2,062,380

TEMPLATE

Donald L. Smith, Dunellen, N. J., assignor to Air Reduction Company, Incorporated, New York, N. Y., a corporation of New York Application March 13, 1936, Serial No. 68,647

13 Claims. (Cl. 33—23)

This invention relates to templates of the type used with magnetic template-followers.

In cutting or welding machines which have a torch supported for universal movement in a plane, the torch is often moved by means of a template-follower connected with the torch support in such relation that the torch and template-follower move along similar courses. One popular and highly successful type of template-follower comprises a roller which is strongly magnetized by an adjacent coil and which is rotated at a uniform speed by an electric motor. The magnetism of the roller causes it to adhere to the edge of a steel template which is cut to the desired shape. The template-follower roller may travel along the outside edge of a template, or it may travel along an inside edge which was formed by cutting an opening through the template.

It is an object of this invention to provide an improved template for magnetic template-followers, and a template which accurately reproduces sharp outside corners without the distortion which has been caused by the radius of the roller on templates of the prior art.

Another object of the invention is to provide a simple and inexpensive template which will cause a magnetized roller to change from one guiding edge to another for its tractive force, and which will effect such a change automatically without the intervention of an attendant.

Other objects, features and advantages of the invention will appear or be pointed out as the specification proceeds.

In the accompanying drawing, forming part hereof:

Fig. 1 is a perspective view of a universal cutting machine equipped with a template embodying the invention;

Figs. 2-4 are enlarged plan views showing a portion of the template of Fig. 1 with the template-follower in different positions;

Fig. 5 is a side elevation looking to the left in Fig. 3; and

Fig. 6 is a sectional view on the line 6—6 of Fig. 3.

The universal cutting machine shown in Fig. 1 includes a column 11 extending upward from a base 12. A torch 14 is supported at the forward end of a jointed arm comprising a rearward link 16 which swings on the column 11 as a fixed pivot, and a forward link 17 connected to the rearward link by a pivot 18.

A template-follower 20 is supported by the forward link of the jointed arm in a position directly over the torch. The template-follower roller 21 is in axial alignment with the cutting jet of the torch 14 so that the torch moves along a course similar to that of the template-follower. The axes of the roller and torch are parallel to the pivot axes of the jointed arms.

The roller 21 is strongly magnetized by a coil 23 in axial alignment with the roller 21. The roller is rotated by a motor 24, of the governor-controlled type commonly used for driving tracers and template-followers of universal cutting machines, the drive being transmitted to the roller 21 through reduction gearing which is well known in the art.

The template includes a plate 26 which is fastened to a supporting bracket on the column 11 by screws 28. The template plate is made of steel or other magnetic material, and extends in a plane normal to the axes of the template-follower and torch.

The template has two movable fingers. A finger 31 on the under side of the template plate is supported for angular movement parallel to the template plate by a bolt 32. The angular movement of the finger 31 is limited by an abutment 33 so that the front edge of the finger 31 can not move beyond an edge 34 of the template. The abutment 33 is a pin rigidly connected to the template plate.

A finger 36 on the upper side of the template plate is connected to the plate by a bolt 37 and is movable about the bolt as a pivot. A pin 38 extending up from the plate 26 limits the movement of the finger 36 so that it can not swing any further to the right than the position shown in Fig. 3 where the edge of the finger 36 is in line with an edge 40 of the template plate.

The corner of the template plate 26 where the edges 34 and 40 come together is made of brass or other non-magnetic material. This brass junction of the edges 34 and 40 is obtained by cutting off the original steel corner of the template plate and replacing it with a brass corner 42.

The fingers 31 and 36 are constructed so as to reduce the magnet attraction between them and the roller 21 along portions of the lengths of the fingers. The finger 31 has a brass insert 44 in its front edge, and the finger 36 has brass inserts 46 and 47 on opposite sides of a beveled portion 48. The decreased surface of the metal close to the roller reduces the friction along the beveled portion 48, and the brass inserts reduce the magnetic attraction by holding the roller spaced from the steel portion of the fingers. Either expedient can be employed in place of the other.

The location of the brass inserts 44 and 46 is best shown in Fig. 3. When both of the fingers 31 and 36 are against their abutments 33 and 38, and the roller 21 is touching both fingers, the inserts 44 and 46 terminate at the points of tangency of the fingers and the roller.

The operation of the template is illustrated in Figs. 2-4. When the cut is started, the roller 21 is against the edge 40 of the template. The attendant moves the finger 31 into contact with the roller 21 when he locates the roller in position to start the cut. At the same time the attendant puts the finger 36 in the position shown in Fig. 3, or almost in that position, as illustrated in Fig. 2.

As the roller 21 travels along the edge 40 the finger 36 is attracted toward the roller and moves into the position shown in Fig. 3 if not originally set in that position. As the roller 21 travels past the brass corner 42 the finger 36 provides an extension of the edge 40. The finger 31 is drawn along behind the roller 21.

When the finger 31 reaches the position shown in Fig. 3 it comes against the pin 33 and can not travel any further with the roller 21. The attraction between the roller 21 and the finger 31 becomes stronger at this point, however, because the point of tangency of the roller and the finger 31 reaches the end of the brass insert 44, and the roller contacts with the steel of the finger. This increased magnetic attraction increases the friction between the roller and the finger so that the roller can not slip at its point of contact with the follower as easily as when the roller was in contact with the brass insert 44 and the attraction relatively light.

At the same time that the attraction and friction between the roller 21 and finger 31 suddenly increases because the roller reaches the end of the brass insert 44, as shown in Fig. 3, the attraction and friction between the roller 21 and the finger 36 suddenly decreases because the roller reaches the beginning of the brass insert 46.

When the parts reach these positions, the roller can not move any further along the finger 36 in line with the edge 40 without pulling away from the finger 31, because the latter finger has come against the pin 33 and can not move forward any further. The increased attraction and friction between the roller 21 and finger 31 and the decreased friction between the roller and finger 36 cause the roller to change its course and start moving along the edge of the finger 31 and pushing the finger 36 ahead of it.

By the time the roller 21 reaches the end of the finger 31 it is in contact with the edge 34. As the finger 36 is pushed out of the way by the roller 21, the friction between the roller and finger 36 never becomes as great as the friction between the roller and finger 31 or plate edge 34 because the roller 21 is always in contact with some portion of the finger 36 which is either faced with a brass insert or of reduced thickness so that the friction-producing attraction between the roller and finger 36 is never as great as that between the roller and the full-thickness edge 34.

From the foregoing description it is apparent that without any intervention by an attendant the roller 21 abruptly changes from the finger 36 to the finger 31 as its traction surface and guiding edge. The path traveled by the center of the roller 21 comprises two straight lines making a sharp right angle, but the edges 34 and 40 may make greater or lesser angles than that shown. Other changes and modifications may be made in the template illustrated without departing from the invention defined in the claims.

I claim:

1. A template comprising a plate having two guide edges in angular relation with one another, a finger connected to the plate and movable to bring an edge of said finger into line with one of said guide edges, and another finger connected to the plate and movable to bring one of its edges into line with the other of said guide edges.

2. A template for guiding a magnetic template-follower, comprising a plate having two guide edges extending in different directions in angular relation, and means movably connected with the plate and shiftable into positions to form extensions of said guide edges of the plate.

3. A template for guiding a magnetic template-follower, comprising a plate having two guide edges extending in different directions in angular relation, fingers movably connected to the plate and constructed and arranged to be moved by the attraction of a magnetic template-follower into positions where the edges of the fingers form continuations of the guide edges, and abutments to prevent the fingers from moving beyond said positions.

4. In a template for a magnetic template-follower, two guiding surfaces for simultaneously contacting a follower roller at different points around the circumference of the roller, means for causing the roller to travel along one of said surfaces and slip on the other surface, means movably supporting said other surface so that it continues to adhere to the roller as the roller travels along the first surface, and means for causing the roller to travel along said other surface as its guide after the roller reaches a predetermined point.

5. A template for guiding a magnetic template-follower, said template comprising a stationary portion having a guiding edge along which the follower travels, and a movable portion constructed and arranged to follow the template-follower during its movement along said guiding edge, and means for causing the movable portion to stop in a definite position where its side becomes the guiding edge.

6. In a template for guiding a magnetic template-follower, two stationary guide surfaces meeting in an outside angle, means movable into positions to form extensions of the guide surfaces, and means for causing a template-follower roller to change from one of said movable means to the other as a traction surface to effect an abrupt change in the direction of travel of the roller.

7. In a template, a guiding edge for the roller of a magnetic template-follower, and a movable member constructed and arranged to follow the roller as it travels along said guiding edge to a location where the side of said movable member becomes the guiding edge.

8. A template comprising a first guide along which the roller of a magnetic template-follower travels, a second guide which follows the roller as it travels along the first guide, and means for causing an abrupt change in the relative attraction of the guides and roller so that said second guide becomes the one from which the template-follower obtains its tractive force.

9. A template comprising a first guide along which the roller of a magnetic template-follower travels, and a second guide movably supported and adapted to be drawn along behind a magnetic roller as the roller travels along the first guide, the character of the edges of the respective guides being such that a magnetic roller is attracted more strongly to the first guide up to a certain point where the edge of at least one of the guides changes so that a magnetic roller is attracted more strongly to the second guide.

10. A template comprising a first guide along which the roller of a magnetic template-follower travels, a second guide movably supported and adapted to be drawn along behind a magnetic roller as the roller travels along the first guide, the character of the edges of the respective guides being such that a magnetic roller is attracted more strongly to the first guide up to a certain point where the edge of at least one of the guides changes so that a magnetic roller is attracted more strongly to the second guide, and means movably supporting the second guide so that it can be pushed out of the way by the roller when said roller is traveling along the second guide.

11. In a template having a guide surface for co-operation with the roller of a magnetic template-follower, a finger movably supported so that it can follow the roller as the roller moves along said guide surface, and abutment means limiting the movement of the finger.

12. A template comprising a plate having an L-shape opening therethrough, the width of said opening being substantially greater than the width of the roller of a magnetic template-follower which the template is designed to guide, a finger connected to the plate for angular movement across one surface of the plate into positions bridging one leg of the L-shape opening, the finger being freely movable so that it is pulled along behind the follower roller as said roller travels along one edge of that leg of the L, and an abutment for stopping further movement of said finger when it reaches a position where its edge which contacts with the follower roller reaches a position in line with the intersecting edge of the other leg of the L.

13. A template comprising a plate having an L-shape opening therethrough, the width of said opening being substantially greater than the width of the roller of a magnetic template-follower which the template is designed to guide, a finger connected to the plate for angular movement across one surface of the plate into positions bridging one leg of the L-shape opening, the finger being freely movable so that it is pulled along behind the follower roller as said roller travels along one edge of that leg of the L, an abutment for stopping further movement of said finger when it reaches a position where its edge which contacts with the follower roller reaches a position in line with the intersecting edge of the other leg of the L, a second finger connected to the plate and movable into position to bring one of its edges into line with that edge along which the roller first travels, and means for causing the roller to change from the second finger to the first finger as a traction surface when the first finger comes against said abutment.

DONALD L. SMITH.